(12) United States Patent
Hackathorne et al.

(10) Patent No.: US 7,875,813 B2
(45) Date of Patent: Jan. 25, 2011

(54) PROGRAMMABLE WEIGHING SCALE THAT TRACKS COMPLETION TIME FOR A PROCESS STEP FOR MULTIPLE CONCURRENT PROCESSES

(75) Inventors: Daniel J. Hackathorne, Milford Center, OH (US); Kevin A. Russo, Lewis Center, OH (US); J. Thomas King, Bexley, OH (US)

(73) Assignee: Mettler-Toledo, Inc., Columbus, OH (US)

( * ) Notice: Subject to any disclaimer, the term of this patent is extended or adjusted under 35 U.S.C. 154(b) by 0 days.

(21) Appl. No.: 11/696,523

(22) Filed: Apr. 4, 2007

(65) Prior Publication Data

US 2008/0245579 A1 Oct. 9, 2008

(51) Int. Cl.
| | |
|---|---|
| G01G 19/40 | (2006.01) |
| G01G 19/414 | (2006.01) |
| G01G 19/415 | (2006.01) |
| G04G 99/00 | (2010.01) |
| A23L 1/00 | (2006.01) |
| G06Q 99/00 | (2006.01) |

(52) U.S. Cl. .................. 177/4; 177/25.13; 426/231; 426/232; 702/173; 705/15; 708/105; 708/111
(58) Field of Classification Search .............. 177/4, 177/25.11–25.19; 702/173; 368/10; 708/105, 708/111; 705/15; 426/231–232
See application file for complete search history.

(56) References Cited

U.S. PATENT DOCUMENTS

| | | | | |
|---|---|---|---|---|
| 4,423,486 | A * | 12/1983 | Berner | 705/416 |
| 4,693,329 | A * | 9/1987 | Hikita | 177/4 |
| 4,807,169 | A * | 2/1989 | Overbeck | 708/200 |
| 4,832,513 | A * | 5/1989 | Ikekita | 400/61 |
| 4,836,309 | A | 6/1989 | Sekioka | |
| 4,884,199 | A * | 11/1989 | Boothroyd et al. | 715/709 |

(Continued)

OTHER PUBLICATIONS

Avery Weigh-Tronix, Avery Berkel M Touch, http://www.averyberkelusa.com/retail/m_touch.htm, webpages printed Jun. 21, 2006, 2 pages.

(Continued)

*Primary Examiner*—Randy W Gibson
(74) *Attorney, Agent, or Firm*—Standley Law Group LLP

(57) ABSTRACT

Food service workers prepare a number of items throughout the day at a food counter, so the workers may need to track process steps for entirely different processes that are running concurrently. For example, the worker may need to remove a pizza from an oven one moment, and remove breadstick dough from a refrigerator one minute later. A programmable weighing scale guides users through process steps of a process, and tracks completion time of process steps for multiple processes, and alerts a food service worker when a next step in one of multiple, concurrently running processes needs to be completed. Because data stored for each process can be selected throughout, for example, an entire working day, the controller of the weighing scale can track timing requirements for each step of each process. The weighing apparatus is independent of other apparatuses used in completing the process steps (e.g., refrigerators, ovens, mixers, etc.), so it can track process steps that involve various apparatuses that may be needed to complete the processes. An alert for one process step associated with one process can be presented within the duration of an entirely different process step for an entirely different process.

25 Claims, 9 Drawing Sheets

U.S. PATENT DOCUMENTS

| | | | | |
|---|---|---|---|---|
| 4,928,229 A * | 5/1990 | Teraoka et al. | ............... | 705/414 |
| 5,239,519 A * | 8/1993 | Nelson et al. | ................. | 368/10 |
| 5,578,797 A * | 11/1996 | Hewitt et al. | .................... | 177/5 |
| 5,960,440 A * | 9/1999 | Brenner et al. | ...................... | 1/1 |
| 6,064,050 A * | 5/2000 | Ishikawa et al. | ............. | 219/720 |
| 6,617,530 B1 * | 9/2003 | Lin | ......................... | 177/25.16 |
| 7,193,163 B1 * | 3/2007 | Kesselman | ............... | 177/25.13 |
| 7,214,891 B1 * | 5/2007 | Hewitt et al. | ................... | 177/4 |
| 7,547,851 B1 * | 6/2009 | Wong | ...................... | 177/25.13 |
| 7,612,302 B2 * | 11/2009 | Tamkin et al. | ........... | 177/25.15 |
| 2005/0256774 A1 * | 11/2005 | Clothier et al. | ............... | 705/15 |
| 2008/0124434 A1 * | 5/2008 | Hrudka | ...................... | 426/233 |
| 2008/0191012 A1 * | 8/2008 | Monnier et al. | ............ | 235/385 |

OTHER PUBLICATIONS

Bizerba USA, Inc., CE-H 500 S—PC scales with color touch screen and video functionality, for self-service or quick-service operation., http://www.bizerbause.com/?action=display&arg0=product&product=60, webpages printed Aug. 8, 2006, 2 pages.

Bizerba USA, Inc., <<Class E-World>> CE-S, 98 90 0171011 2nd edition, 6 pages.

Rice Lake Weighing Systems, Ishida ScaleLink System Integration, http://www.ishidaretail.com/products/specs/scallink.html, 2004, 3 pages.

Rice Lake Weighing Systems, Dekalb Farmers Market, A State-of-the-Art Retail Solution for a Cutting-Edge Market, Summer 2005, pp. 20-21.

Ishida and Rice Lake Weighing Systems, SR-2000a Price Computing Scale With Color Touchscreen, 22 pages.

* cited by examiner

FIG-3

Process Control Wizard

Please enter the Process Control Stage and press <Enter>

BAKED
CINNAMON STICK
PRE-TOP

1– IN COOLER
2– TEMPERED
3– RETARD
4– FINISH

Process Control Stage: 0

| 7 | 8 | 9 | CLEAR |
|---|---|---|---|
| 4 | 5 | 6 | |
| 1 | 2 | 3 | ENTER |
| 0 | . | BACK SPACE | |

(Cancel) (Next>)

Contents/Qty: 1

Printer On-Line – Primary Database On-Line

Product Process Control Number: 999981
Product Process Control Stage:
Slack Time Breadstick Dough Next    List Pack Date       02/20/07 03:09 PM
                02/20/07 03:09 PM
Expire Time:    02/21/07 03:09 PM View Extra Text: 0

Label Format
2_4_Process_style_6  ▷

Accumulator
None  ▷

Number of Labels
1  ▷

Clear

PRINT

Label Printer Setup

Current Label Stock
2_4" Label Stock ▽

Run Total Label Format
Defaults:2_4" Run Total ▽

☑ Stripped Delivery

Image Offset
0.0

Label Width
64.0

NF Label Format
2_4" U Nutrition Facts

Eject Length
10.0

Std Pack Formats
0:2_4" SP Sell BCB FS
1:2_4" U SP Sell Grd BCU FS
2:2_4" SP Sell BCB FS
3:2_4" U SP Sell Grd BCU FS
4:2_4" SP Sell BCB FS
5:2_4" U SP Sell Grd BCU FS
6:2_4" SP Sell BCB FS
7:2_4" U SP Sell Grd BCU FS

Pre Pack Formats
0:2_4" PP Sell BCB FS
1:2_4" U PP Sell Grd BCU FS
2:2_4" PP Sell BCB FS
3:2_4" U PP Sell Grd BCU FS
4:2_4" PP Sell BCB FS
5:2_4" U PP Sell Grd BCU FS
6:2_4" PP Sell BCB FS
7:2_4" U PP Sell Grd BCU FS

Process Product Formats
0:2_4_Production_style_0
1:2_4_Process_style_1
2:2_4_Receiving_style_2
3:2_4_Date_opened_style_3
4:2_4_Production_Cookies_style_4
5:2_4_Production_Bagel_style_5
6:2_4_Process_style_6
7:2_4_PPCI ( Save )  ( Cancel )  ( Refresh )

FIG-9

PROGRAMMABLE WEIGHING SCALE THAT TRACKS COMPLETION TIME FOR A PROCESS STEP FOR MULTIPLE CONCURRENT PROCESSES

BACKGROUND AND SUMMARY OF THE EXEMPLARY EMBODIMENTS

The exemplary embodiments relate generally to weighing apparatus and more specifically to weighing apparatus for assisting in the management of inventory and related processes.

Many types of weighing apparatus are known in the art. One type of weighing apparatus may generally be used in the retail environment. Typically, these types of weighing apparatus may be placed in retail establishments such as, but not limited to, grocery stores, department stores and general merchandise stores. These weighing apparatus may be placed in many different locations throughout these stores. For example, the weighing apparatus may be placed in the deli, bakery, meat department, produce department, and/or mini stores. Mini stores may be smaller retail establishments within a larger retail establishment. Examples of mini stores include restaurants, coffee shops, etc.

These locations may have many items that may be subject to spoilage. The items may generally be food items, but are not limited to food items. The food items may be items available for purchase by customers or ingredients to be used with other food items to create another food item which may be sold to customers. The locations associate these items with dates and/or times. The dates/times may show when an item must be sold by, used by or moved on to a next step in a process. Currently, these dates/times are created and monitored manually. When an item is created, an employee may mark a card or print a label with the appropriate date/time. Once the date/time is reached, the item may be thrown away or moved to the next step in the process along with a new card or label displaying the next appropriate date/time information.

This process may be burdensome, difficult to maintain and support and subject to may errors. First, each item must have a separate label or card. Not only is this a time consuming process, but it is also subject to many errors due to the manual entry of the date/time onto each card or label. Second, each card or label must be monitored manually. If a date/time expires and no employees have noticed, then the items may either be sold to a customer or expire before being used in the next step of a process, thus leading to wasted products. Third, individual ingredients may not be tracked for each process step. The exemplary embodiments attempt to solve or mitigate these problems by providing a weighing apparatus having a plurality of user interfaces, one of which may be a process control interface. The process control interface may include a plurality of process steps which may provide process data to a print interface for printing a label with the process data.

BRIEF DESCRIPTION OF THE DRAWINGS

In addition to the features mentioned above, other aspects of the exemplary embodiments will be readily apparent from the following descriptions of the drawings, wherein like reference numerals across the several views refer to identical or equivalent features, and wherein:

FIG. 3 illustrates a process control interface of one exemplary embodiment of a weighing apparatus.

FIG. 6 illustrates a main interface of another exemplary embodiment of a weighing apparatus.

FIG. 8 illustrates a print interface of another exemplary embodiment of a weighing apparatus.

FIG. 9 illustrates a label setup interface of one exemplary embodiment of a weighing apparatus.

DETAILED DESCRIPTION OF THE EXEMPLARY EMBODIMENT(S)

The exemplary embodiments may generally be directed to weighing apparatus. More specifically, the exemplary embodiments may be directed to a weighing apparatus which may assist in controlling and tracking inventory and related processes, and methods for performing the same. In general, the weighing apparatus may include a force measuring device, a display and a controller. A main interface, a process control interface and a print interface may be presented on the display for guiding a user through a plurality of steps. The main interface may include a plurality of page presets and a plurality of item presets. The page presets may allow different item presets to be displayed on the main interface. Pressing the item presets may display the process control interface for that particular item. The process control interface may allow the user to enter information about the next step of the process which may be preloaded into the print interface. The print interface may allow the user to configure the label to be printed. The controller may track the information entered about the items and alert the user when an item has expired or needs to be moved to the next step of the process.

Figure 1:
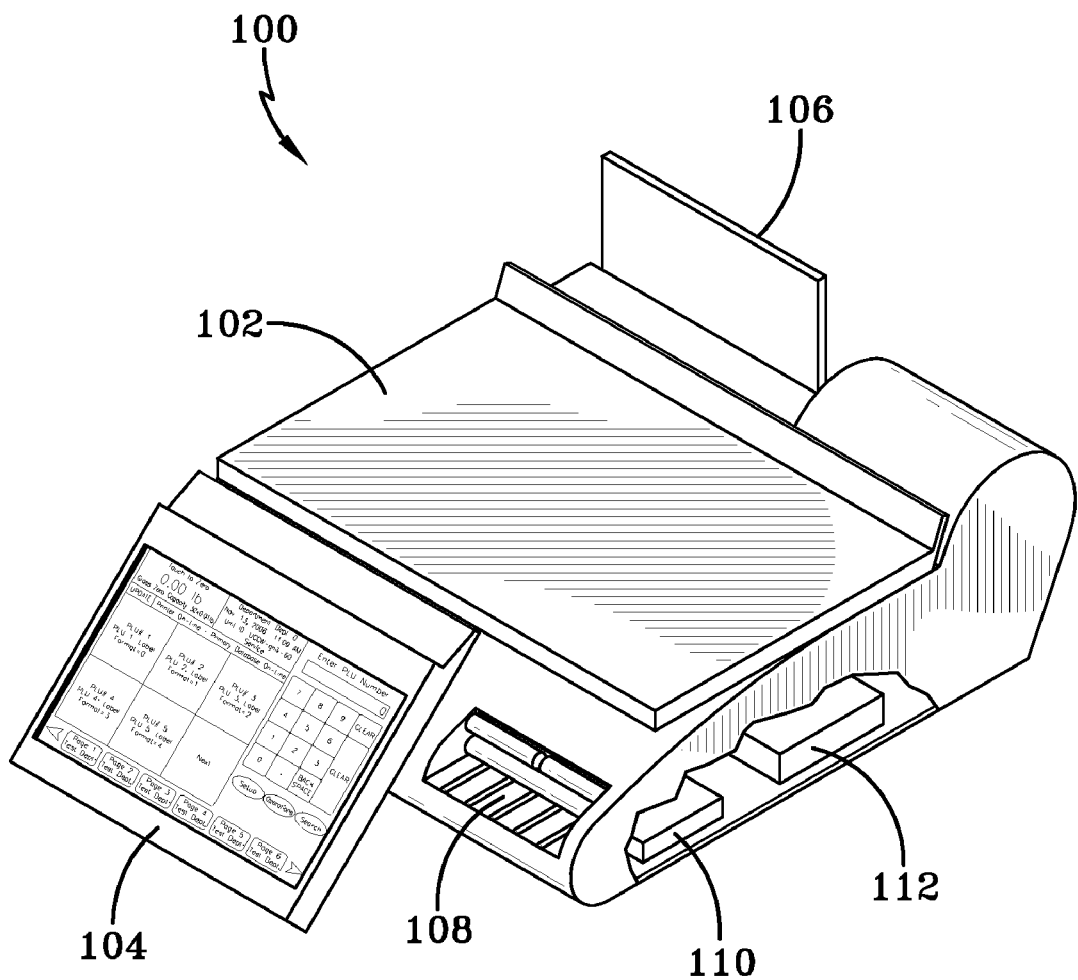
FIG. 1 illustrates a perspective view of one exemplary embodiment of a weighing apparatus.

FIG. 1 illustrates one exemplary embodiment of a weighing apparatus that may have the features described above. The weighing apparatus 100 may have a force-measuring device (not shown) and a platform 102. The force-measuring device may determine the weight of an item that may be placed on the platform 102, as is known in the art. The force-measuring device can be any force-measuring device known in the art such as, but not limited to, a load cell. The weighing apparatus 100 may include an operator display 104. The operator display 104 can be integrated into the weighing apparatus 100 or be a standalone unit. The operator display 104 may generally face the operator of the weighing apparatus. The operator display 104 may be any display known in the art. For example, the operator display 104 can be a VF display, an LCD, a touch screen or any other similar display. The operator display 104 shown in FIG. 1 is a touch screen display. If a touch screen display is not used then it should be apparent that the operator display 104 could be coupled to one or more input devices such as, but not limited to, a keyboard, keypad, mouse or other similar input device. The weighing apparatus 100 may also include a customer display 106. The customer display 106 may generally face the customer. The customer display 106 may also be any display known in the art. The weighing apparatus 100 may have a printer 108. The printer 108 may be used to print labels or similar media. The weighing apparatus 100 may contain a controller 110. The controller 110 may be a programmable device capable of receiving and executing commands. Any controller known in the art may be used in the weighing apparatus 100. For example, the controller 110 may be an integrated processor with memory, a personal computer running a WINDOWS operating system or any other similar configuration. In one exemplary embodiment, a database 112 may be included in the weighing apparatus 100.

Figure 2:
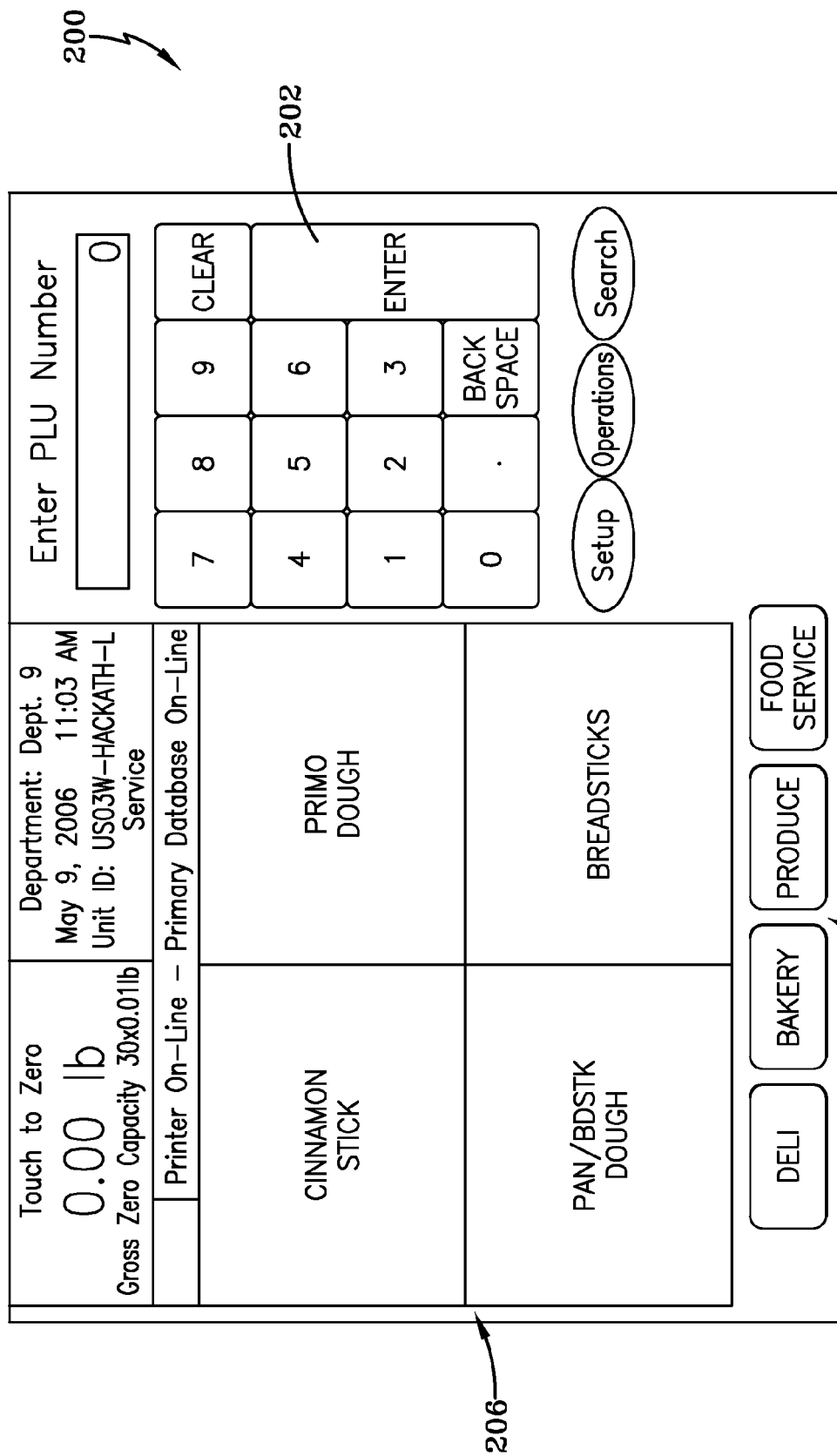
FIG. 2 illustrates a main interface of one exemplary embodiment of a weighing apparatus.
Figure 6:
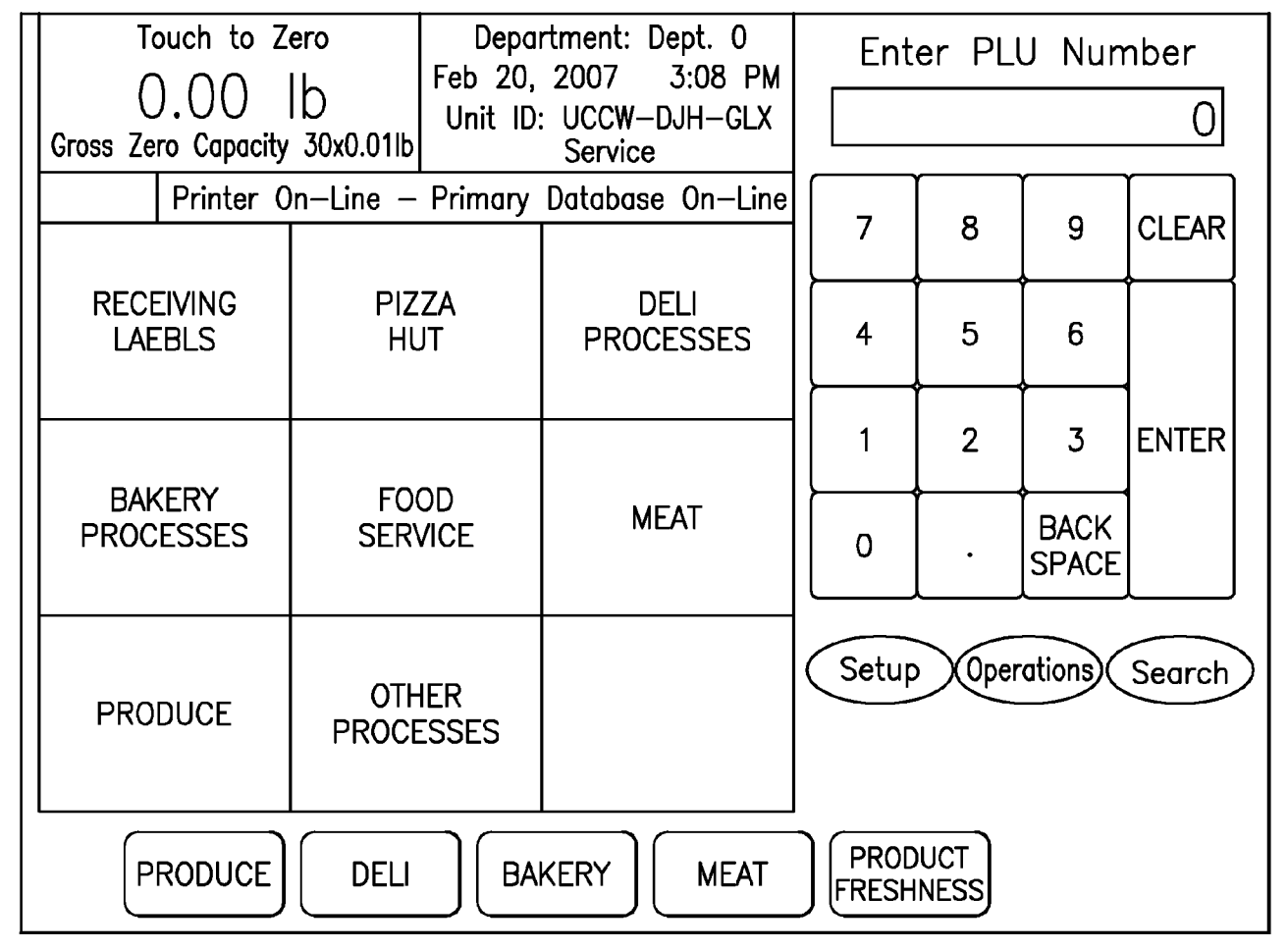

The operator display 104 may be capable of presenting a plurality of user interfaces to the operator. The user interfaces may allow the operator to input data and execute commands with the weighing apparatus 100. One such user interface is shown in FIG. 2. The main interface 200 may have a keypad 202. The main interface 200 may include a plurality of page presets 204 and a plurality of item presets 206. The page and item presets may be fully customizable by the operator or owner of the weighing apparatus 100, as will be discussed in more detail below. In one exemplary embodiment, the page presets 204 may be associated with different departments in a grocery store. The item presets 206 may be associated with individual page presets 204 so that when a particular page preset 204 is selected; a plurality of item presets 206 may be displayed. Another exemplary embodiment of a main interface is shown in FIG. 6. Selecting a particular item preset may display a second user interface, such as the user interface illustrated in FIG. 3.

Figure 4:
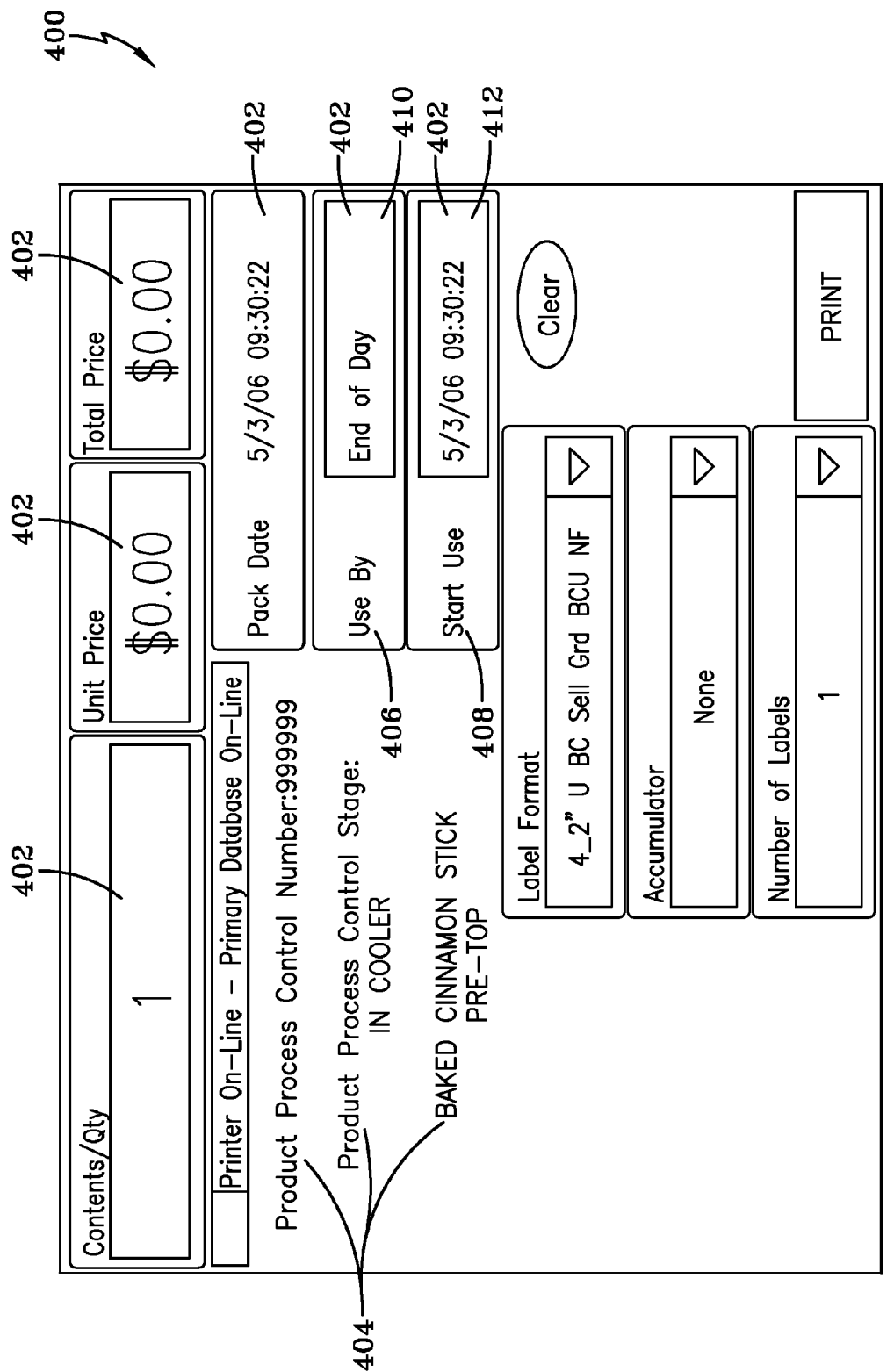
FIG. 4 illustrates a print interface of one exemplary embodiment of a weighing apparatus.
Figure 7:
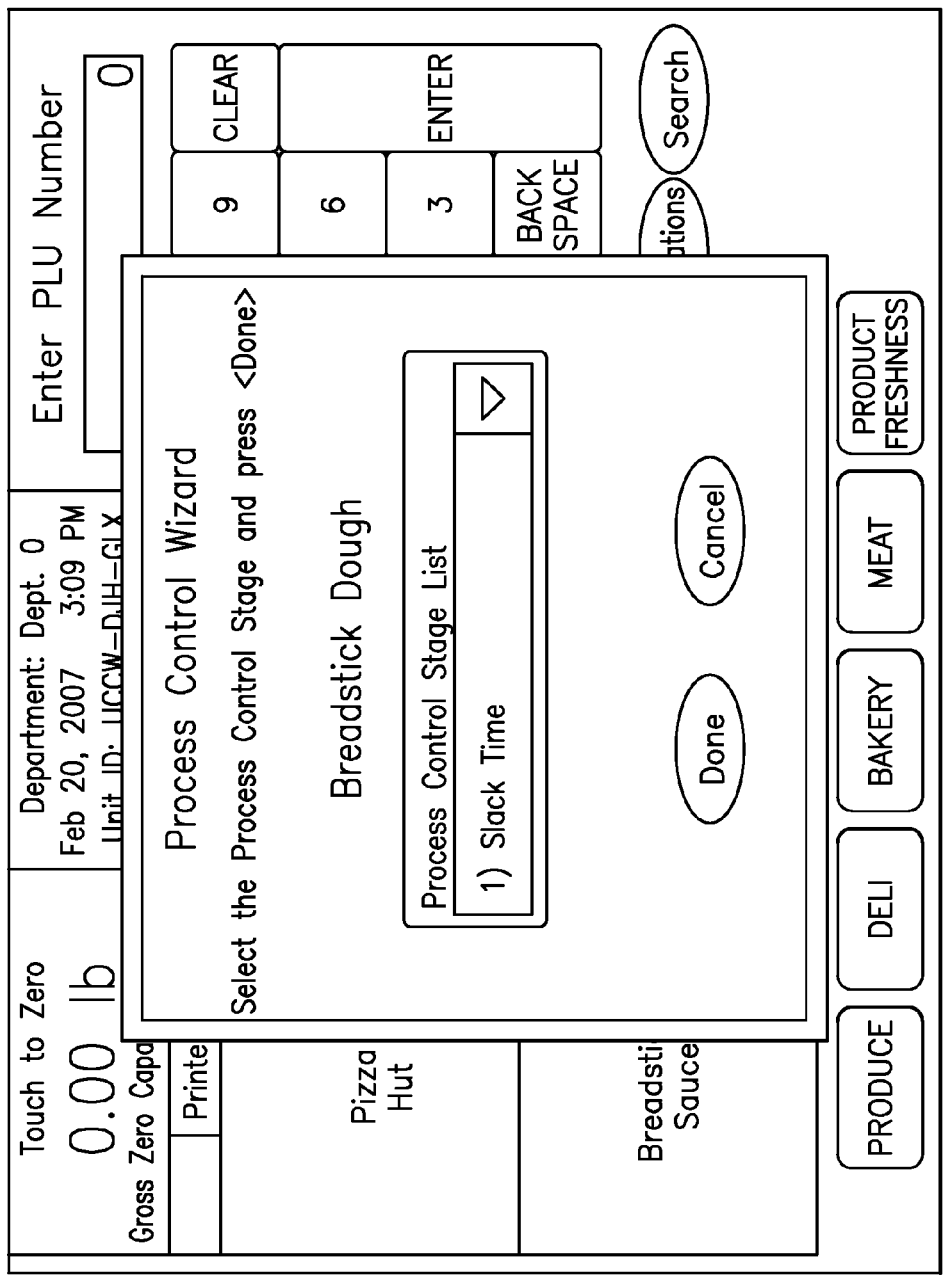
FIG. 7 illustrates a process control interface of another exemplary embodiment of a weighing apparatus.

FIG. 3 illustrates a process control interface 300 which may have a plurality of process steps 302. The process steps 302 may be implemented as a numbered list as shown in FIG. 3, a drop down list as shown in FIG. 7 or may be implemented similarly to the page and/or item presets shown in FIGS. 2 and 6. Once a process step 302 is selected, a third user interface may be displayed, such as that shown in FIG. 4. If an item preset only has one associated process step, the user interface 300 in FIG. 3 may be skipped and user interface 400 may be displayed. A print interface 400 may contain a plurality of fields 402 and text areas 404 that may contain information to be printed onto a label. The fields 402 may be capable of being edited by the operator to customize the layout and information associated with the label(s) being printed. One or more fields 402 and text areas 404 may be pre-filled with data received from the process control interface 300. The pre-filled data may be predefined as part of the process step 302. For example, text areas 406 and 408 may be pre-filled with data that describes the time frame of the selected process step 302, such as 'MUST USE BEFORE' or 'MUST USE AFTER'. Similarly, fields 410 and 412 may be pre-filled with a date/time that is a certain number of days, hours, minutes and/or seconds in advance of the current date/time. The fields 410 and 412 may also be pre-filled with data that describes a time, such as, 'END OF DAY'. One or more labels may be printed by printer 108 and associated with an item or items to be sold or used in processes. Another exemplary embodiment of a print interface is shown in FIG. 8. In one exemplary embodiment, the controller 110 may track the process information, such as process step data and date/time data and may alert the operator when an item or items are ready for the next step in the process. This information may be stored in a database 112. FIG. 9 illustrates a label setup interface. The label setup interface may allow label types to be edited. Information such as, the length, width, offset and formats of the labels associated with a particular label may be changed.

Figure 5:
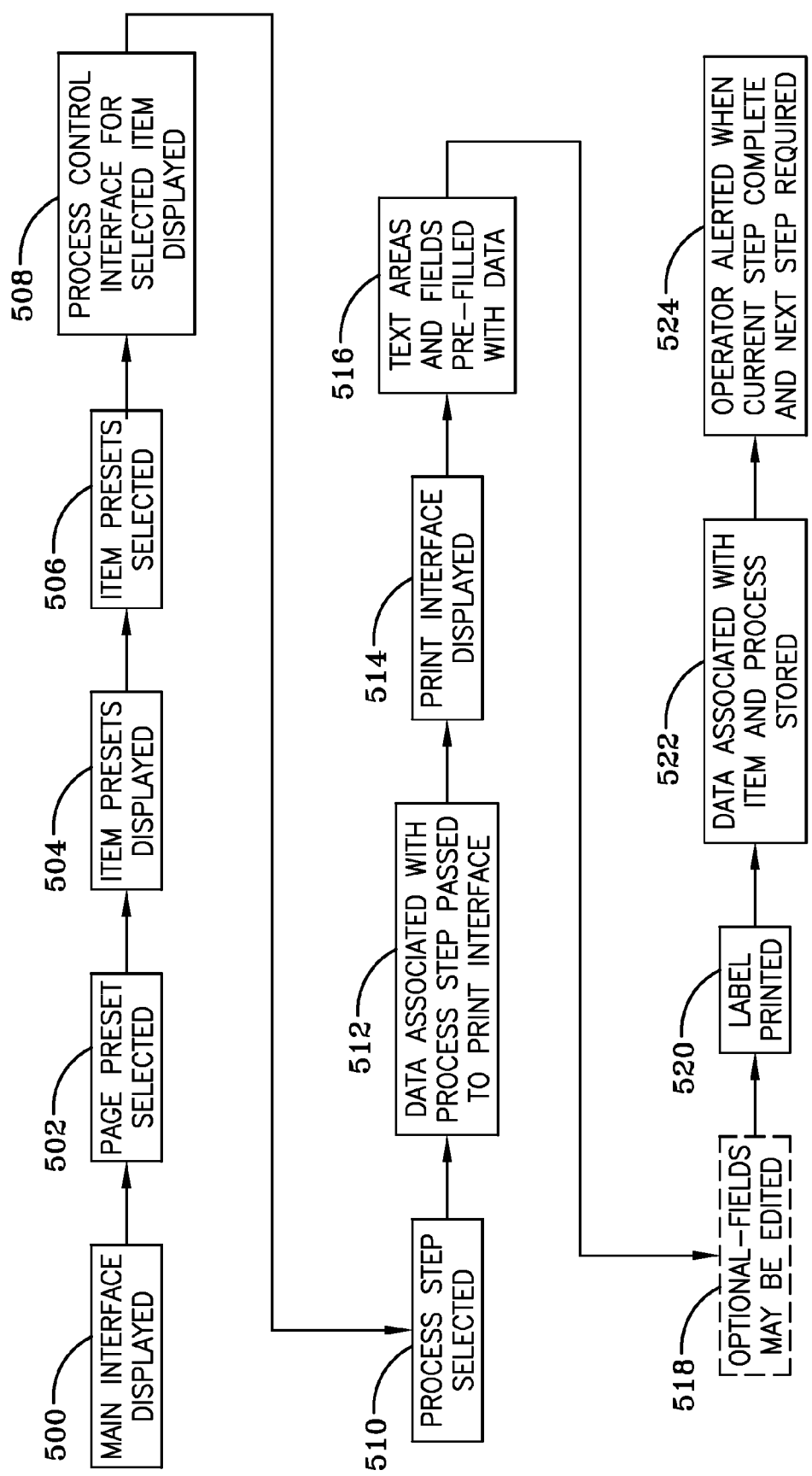
FIG. 5 illustrates a flow chart of one exemplary method for one exemplary embodiment of a weighing apparatus.

An example of the steps that may be taken in one exemplary embodiment of a method of use of an exemplary weighing apparatus is illustrated in FIG. 5. First, the main interface 200 may be presented on the display 106 at step 500. Next, the operator may select a page preset 204 at step 502, which may cause the item presets 206 for the selected page preset 204 to be displayed on the main interface 200 at step 504. At step 506, the operator may select an item preset 206. This may cause the process control interface 300 for the selected item to be presented on the display 106 at step 508. Next, at step 510, the operator may select a process step for the item. Data associated with the process step and item may be passed to the print interface 400 at step 512 and the print interface 400 may be presented on the display at step 514. Next, at step 516, the text areas 404 and fields 402 may be pre-filled with the data received from step 512. At optional step 518, the data in the fields 402 may be edited. Next, a label or labels may be printed at step 520. Optionally, after printing the label or labels, data associated with the item and process step may be stored at step 522. The controller 110 may track this stored information and later alert the operator when the current step is complete and the next step is required at step 524.

As discussed above, the user interfaces 200 may be customized by the owner or operator of the weighing apparatus 100. The user interfaces 200, 300 and/or 400 may be customized through the modifications of a plurality of definition files. The definition files may describe the layout and function of each user interface. Exemplary definition files may include a structure file, a mapping file, a data file and a process file. The structure file may be used to define the structure of the user interfaces. For example, the structure file may include a plurality of tags that may define structural components of the user interface. Structural components may include how many presets are included on the user interface, the size of the grid of presets, the labels associated with the presets and other similar information. The mapping file may include tags that define what pages each of the presets may navigate to when they are selected. The data file includes data to be included in the user interfaces, such as PLU data, pricing data, etc. The process file may include tags which define the process steps and associated data. For example, the tags may define the process step name, the associated preset item, the associated department, the start use date/time for the process step, the end use date/time for the process step, the legend for the start and end use dates/times, the duration of the process step, the label style associated with the process step and other similar information. The owner and/or operator of the weighing apparatus may edit these definition files to customize each of the user interfaces, what actions are taken when presets are selected, the data associated with those presets, the process steps and data associated with those process steps. This may allow the owner and/or operator to edit their process steps and other data directly as their processes may change or new processes are added.

While certain exemplary embodiments are described in detail above, the scope of the application is not to be considered limited by such disclosure, and modifications are possible without departing from the spirit of the invention as evidenced by the following claims:

What is claimed is:

1. A weighing apparatus for directing processes involving perishable items of interest, comprising:
    a display;
    a main interface presented on said display, said main interface having a plurality of presets, each of which leads to a process control interface associated with a perishable item of interest;
    a process control interface presented on said display upon selection of an associated preset, said process control interface having a plurality of selectable process steps, said process steps including process data relating to a process involving said perishable item of interest, said process defined in a process file that includes:

(a) product identifier data,
(b) process step identifier data for each of a plurality of process steps for preparing said perishable item,
(c) start time data for a process step,
(d) duration or end time data for a process step; and
a controller and associated software configured to direct said process defined by said process steps, said software including said process file and utilized by said controller:
(1) to guide a user through performing a plurality of process steps for each of a plurality of processes;
(2) to compare said start time data and said duration or end time data for each of said process steps to determine when items for said processes need to move to a next process step; and
(3) to provide during said start time and said duration or end time for a process step of a second one of said plurality of processes an alert to a user of said apparatus using at least said display of said weighing apparatus when an item for a first one of said plurality of processes needs to move to a next process step.

2. The weighing apparatus of claim 1 wherein said process file includes date and/or time data for each of said plurality of process steps.

3. The weighing apparatus of claim 2 wherein said process file includes start time and end time data for each of said plurality of process steps.

4. The weighing apparatus of claim 1 wherein said process file further includes data selected from the group consisting of an associated department, start date for a process step, end date for a process step, a legend for a start or end date/time, and a label style associated with the process step.

5. The weighing apparatus of claim 1 further comprising a print interface, said print interface operative to cause the printing by a printer of one or more labels that contain at least a portion of said process step data, said one or more labels for subsequent association with said perishable item of interest.

6. The weighing apparatus of claim 5 further comprising a printer for printing labels associated with said process steps.

7. The weighing apparatus of claim 1 further comprising a database for storing process files.

8. The weighing apparatus of claim 1 wherein said weighing apparatus guides a user through the performance of process steps related to the preparation of a food item to be made available for purchase by customers.

9. A system for creating and directing processes that use a plurality of perishable items of interest, comprising:
a weighing apparatus, said weighing apparatus further comprising:
a display,
a main interface presented on said display, said main interface having a plurality of page presets,
at least one item preset associated with each of said plurality of page presets, said at least one item preset associated with a perishable item of interest and displayable on said display,
a process control interface associated with each of said item presets for said plurality of page presets, said process control interface presented on said display upon selection of an associated item preset, said process control interface having a plurality of selectable process steps that include process data relating to a process involving a perishable item of interest, said process data contained in an editable process file that includes:
(a) product identifier data,
(b) process step identifier data for each of a plurality of process steps for preparing said perishable item,
(c) start time data for a process step,
(d) duration or end time data for a process step; and
a controller and associated software configured to direct said process defined by said process steps, said controller utilizing said process data of said process file:
(1) to guide a user through performing a plurality of process steps for each of a plurality of processes;
(2) to compare said start time data and said duration data for each of said process steps to determine when to provide an alert; and
(3) to provide during a start time and an end time for a process step of a second one of said plurality of processes an alert to a user of said system within the duration of a process step for a first one of said plurality of processes;
a means for creating process files; and
a database of process files in communication with said controller and associated software, each process file containing process data for a process that may be directed by said weighing apparatus.

10. The system of claim 9 wherein said main interface is defined at least in part by a structure file, said structure file being editable and including data for defining the structure of at least said main interface.

11. The system of claim 9 further comprising:
a mapping file associated with said presets.

12. The system of claim 11 further comprising:
a data file associated with said presets.

13. The system of claim 9 further comprising:
a mapping file and a data file associated with said presets.

14. The system of claim 9 wherein said controller tracks the progress of a process step and alerts a user to a condition selected from the group consisting of the impending expiration of a current process step, the end of a current process step and the need to perform a subsequent process step.

15. A method for controlling a plurality of processes involving perishable items of interest comprising:
providing a weighing apparatus having a display;
providing said weighing apparatus with a controller and associated software configured to direct preparation of said perishable item of interest according to steps of said process;
providing a process file containing process data defining steps of said process, said process data utilized by said controller of said weighing apparatus to guide a user through performing said steps of said process, said process data including:
(a) a product identifier,
(b) a process step identifier,
(c) a start time for the process step, and
(d) a duration or end time for the process step,
displaying on said display of said weighing apparatus a main interface having a plurality of page presets;
receiving user selections of a plurality of said plurality of page presets;
in response to each user selection, displaying at least one item preset associated with each of said selected page presets;
receiving user selections of a plurality of item presets corresponding to a perishable item of interest;
in response to each user selection, displaying on said display of said weighing apparatus a process control interface associated with said item preset, said process control interface displaying said steps of said process as defined in said process file;

selecting a process step;

using data displayed as a result of selecting said process step as a guide to performing said process step; and providing within the duration of a process step for a second one of said plurality of processes an alert to a user of said weighing apparatus within the duration of a given process step for a first one of said plurality of processes using at least said display of said weighing apparatus.

16. The method of claim 15 wherein said process data further includes data selected from the group consisting of process step start date, process step end date, associated department, a legend for a start or end date, a legend for a start or end time, and a label style associated with a given process step.

17. The method of claim 16 wherein said process data includes start time and end time data.

18. The method of claim 15 further comprising using said controller to track data related to said process steps.

19. The method of claim 18 wherein said controller alerts an operator to a condition selected from the group consisting of the impending expiration of a current process step, the end of a current process step and the need to perform a new process step.

20. The system of claim 9 further comprising a print interface, said print interface operative to cause the printing by a printer of one or more labels that contain at least a portion of said process data, said one or more labels for subsequent association with said perishable item of interest.

21. The system of claim 20 further comprising a printer for printing labels associated with said process steps.

22. The system of claim 9 wherein said process file further includes data selected from the group consisting of process step start date, process step end date, associated department, a legend for a start or end date, a legend for a start or end time, and a label style associated with a given process step.

23. The system of claim 9 further comprising a database for storing process files.

24. The method of claim 15 further comprising displaying a print interface on said display of said weighing apparatus, said print interface including at least a portion of said process data associated with a selected process step, said print interface operative to cause the printing by a printer of one or more labels that contain at least said portion of said process data.

25. The method of claim 24 further comprising printing at least one label including at least said portion of said process data, said at least one label for subsequent association with said perishable item of interest.

* * * * *